United States Patent [19]

Kimura et al.

[11] 4,273,749

[45] Jun. 16, 1981

[54] REFINING PROCESS OF HOT GAS CONTAINING HYDROGEN SULFIDE AND AMMONIA

[75] Inventors: Shoichi Kimura; Toshihiko Takahashi; Zensuke Tamura, all of Kudamatsu, Japan

[73] Assignee: Hitachi, Ltd., Tokyo, Japan

[21] Appl. No.: 912,949

[22] Filed: Jun. 5, 1978

[30] Foreign Application Priority Data

Jun. 3, 1977 [JP] Japan ................................. 52-64713
Jun. 6, 1977 [JP] Japan ................................. 52-65793

[51] Int. Cl.³ ............................................. B01D 53/34
[52] U.S. Cl. ............................... 423/231; 423/237;
423/351; 423/539; 423/648 R
[58] Field of Search ............. 423/230, 231, 237, 400,
423/406, 236, 230, 231, 351, 648 R, 539

[56] References Cited

U.S. PATENT DOCUMENTS

| 1,746,209 | 2/1930 | Alexander | 423/351 X |
|---|---|---|---|
| 1,757,826 | 5/1930 | Bannister | 423/231 |
| 2,013,809 | 9/1935 | Salisbury | 423/351 X |
| 2,837,398 | 6/1958 | Grosskinsky et al. | 423/234 X |
| 3,545,931 | 12/1970 | McKinley, Jr. | 423/648 R |
| 3,579,293 | 5/1971 | Shultz et al. | 423/231 |
| 3,773,912 | 11/1973 | Spangler, Jr. | 423/237 |
| 3,812,236 | 5/1974 | Adams et al. | 423/237 |
| 3,822,337 | 7/1974 | Wunderlich et al. | 423/224 |

OTHER PUBLICATIONS

Jacobson, "Encyclopedia of Chemical Reactions", Reinhold Publishing Co., New York, vol. IV, 1951, p. 103.
U.S. patent application Ser. No. 771,911, filed Feb. 25, 1977.

Primary Examiner—Earl C. Thomas
Attorney, Agent, or Firm—Thomas E. Beall, Jr.

[57] ABSTRACT

A refining process of a hot gas such as coal gas containing hydrogen sulfide and ammonia comprises steps of contacting the hot gas with a first catalyst comprising iron oxide to remove hydrogen sulfide, and then contacting the hot gas with a second catalyst comprising reduced iron made by reducing iron oxide prior to introducing the hot gas into the catalyst to remove ammonia. The refining process further includes steps of temperature adjustment of the gas directing to the first and second catalyst and the removal of hydrogen sulfide remaining in the hot gas after the removal of the ammonia with a third catalyst comprising iron oxide.

21 Claims, 8 Drawing Figures

REFINING PROCESS OF HOT GAS CONTAINING HYDROGEN SULFIDE AND AMMONIA

BACKGROUND OF THE INVENTION

This invention relates to a refining process of a hot gas containing hydrogen sulfide and ammonia, particularly to a process for removing hydrogen sulfide and ammonia from a coal gas.

The art of gasifying fossil fuel to synthesize a gaseous fuel such as methane, etc. is well known.

Recently coal has been acknowledged again as an energy resource instead of oil. In a power generation system utilizing the coal, it is necessary from the standpoint of resource saving and energy saving to combust the synthesized gaseous fuel of elevated temperature without lowering its temperature to operate a gas turbine. However, the fossil fuel such as coal inevitably contains sulfur and nitrogen which are converted to hydrogen sulfide and ammonia, respectively, when gasified. The synthesized gaseous fuel contains the hydrogen sulfide and ammonia at concentration from 1000 ppm to several percentages. As the hydrogen sulfide is a highly corrosive gas, and the ammonia is converted to nitrogen oxide when the synthesized gaseous fuel is combusted, both of them can not be discharged into the atmosphere on the ground of environmental pollution. Further from the ground of protection of the gas turbine and economy, also, it is necessary to remove the hydrogen sulfide and ammonia from the synthesized gaseous fuel before the combustion. Therefore, development of the removing art of the hydrogen sulfide and ammonia at an elevated temperature is demanded as a key point for the success of the power generation system using coal as a fuel resource.

Hitherto, as a method of removing hydrogen sulfide in a hot gas such as the coal gas at a high temperature, a dry method using a granular solid removing agent is known to be effective. As there moving agent, calcium carbonate dolomite, iron oxide etc. are known. The iron oxide among these agents is said to be most excellent from the standpoints of a removal ratio of the hydrogen sulfide, easiness of regenerating the removing agent weakened in its activity, economy etc.

The iron oxide such as ferric oxide reacts with the hydrogen sulfide to form Fe S according to the following equation (1).

$$Fe_2O_3 + 2H_2S + H_2 \rightarrow 2FeS + 3H_2O \qquad (1)$$

After the ferric oxide is converted to the iron sulfide, the ferric oxide loses the ability of the removal of the hydrogen sulfide, so that it is necessary to restore the removal ability by regenerating. As a method of regenerating the ferric oxide, a method is used such that the iron sulfide is contacted with air, or steam mixed with air to restore it to the iron oxide while producing $SO_2$ gas or $H_2S$, which reactions are as follows:

$$4FeS + 7O_2 \rightarrow 2Fe_2O_3 + 4SO_2 \qquad (2)$$

$$2FeS + 3H_2O \rightarrow Fe_2O_3 + 2H_2S + H_2 \qquad (3)$$

Thus, since when the $H_2S$ is removed the production of the FeS accompanies the production of water, water component in the gas restrains the $H_2S$ removal reaction shown by the equation (1). Therefore, a concentration of the $H_2S$ determined by both of a gas temperature and a water concentration of the gas remains.

It is known by U.S. patent application Ser. No. 771,911 filed Feb. 25, 1977 that ammonia is decomposed by the iron oxide. However the coal gas including both the ammonia and hydrogen sulfide is not decomposed by the iron oxide at a high decomposition rate. This is because the hydrogen sulfide and water work to obstruct the ammonia decomposition, which is explained later in detail. It is difficult to remove completely the hydrogen sulfide in its removal process, a certain concentration of the hydrogen sulfide remains as abovementioned. The water is included in the coal gas, further it is formed also through the reaction (1).

Accordingly the ammonia decomposition is not effective enough.

The other relevant prior arts are as follows
1. U.S. Pat. No. 3,812,236
   "Removal Of Ammonia And Organic Impurities From An Ammonia Plant".
2. U.S. Pat. No. 3,822,337
   "Process For Elimination Of Ammonia And Hydrogen Sulfide From Gases Generated in Coke Plants And Gas Works".

SUMMARY OF THE INVENTION

An object of the invention is to provide a refining process of a hot gas such as a coal gas containing ammonia and hydrogen sulfide, wherein the ammonia can be decomposed at a high decomposition rate and removal therefrom.

Another object of the invention is to provide a refining process of, a hot gas such as a coal gas containing ammonia and hydrogen sulfide, wherein the ammonia and hydrogen sulfide each can be decomposed at a high rate and removed therefrom.

Further another object of the invention is to provide a refining process of a hot gas such as a coal gas containing hydrogen sulfide and ammonia in which the ammonia and the hydrogen sulfide each can be removed effectively and economically at a high rate.

Further another object of the invention is to provide a refining process of a hot gas such as a coal gas containing hydrogen sulfide and ammonia in which the ammonia in the high temperature coal gas produced in a gasifying furnace can be decomposed and removed effectively and economically at a high decomposition rate at a high temperature.

The invention is made, based on the new fact discovered by the study of ammonia decomposition mechanism using a catalyst comprising iron oxide. The study experimentally made clear that the cause of low decomposition rate of ammonia in coal gases in the presence of the catalyst is due to water and hydrogen sulfide in the coal gases, and found the new fact that the water and hydrogen sulfide only slightly affect the ammonia decomposition when the ammonia decomposition is effected by a catalyst comprising reduced state iron which is formed by the reduction of the iron oxide using a reducing gas such as hydrogen gas.

Briefly stated, a feature of the invention comprises steps of removing hydrogen sulfide in a coal gas, reducing a catalyst comprising iron oxide using a reducing gas such as hydrogen gas, and decomposing ammonia in the coal gas using the reduced catalyst.

DESCRIPTION OF THE PREFERRED EMBODIMENTS

Figure 1:
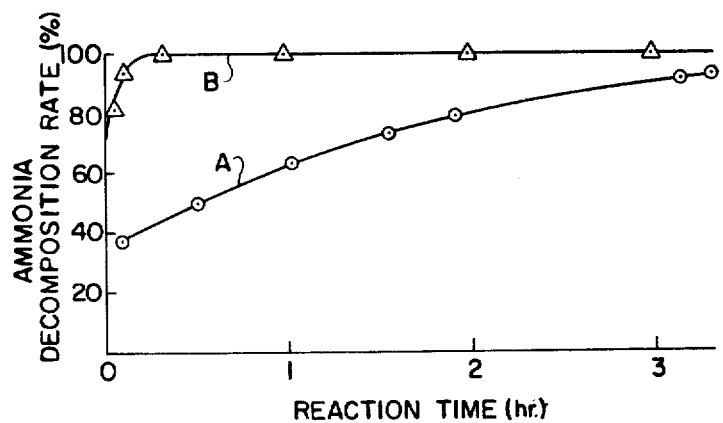
FIG. 1 is a graph showing experimental results on relations between decomposition rates of ammonia in ideal gases and reaction time.

Before embodiments of the invention are described, problems of ammonia decomposition using iron oxide will be described hereinafter in detail.

Decomposition of ammonia using the iron oxide such as ferric oxide is effected as shown by the following reactions.

$$Fe_2O_3 + 3H_2 \rightarrow 2Fe + 3H_2O \quad (4)$$

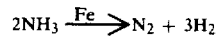

$$2NH_3 \xrightarrow{Fe} N_2 + 3H_2 \quad (5)$$

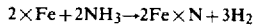

$$2 \times Fe + 2NH_3 \rightarrow 2Fe \times N + 3H_2 \quad (6)$$

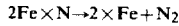

$$2Fe \times N \rightarrow 2 \times Fe + N_2 \quad (7)$$

FIG. 1 is to prove the ammonia decomposition mechanism shown by the equations (4) to (7), namely, in case A, a catalyst of the ferric oxide is contacted with a gas which contain 1% of ammonia, and helium gas as a dilution gas which does not react with the catalyst and in case B, the catalyst is contacted with a gas which contains 1% of ammonia 10% of hydrogen gas and helium gas as a dilution gas. In case A, heat decomposition of a little amount of ammonia takes place to produce hydrogen gas. This little amount of hydrogen gas reduces the ferric oxide to form reduced iron according to the equation (4). By the activity of the reduced iron, ammonia is decomposed according to the equation (5) to further produce the hydrogen gas for reducing the ferric oxide. Thus, by gradually increasing the amount of reduced iron, the rate of ammonia decomposition gradually increases and reaches nearly 100%. On the other hand, in case B, the ferric oxide is quickly reduced to form reduced iron which is active in ammonia decomposition so that in a very short time after starting to contact with the gas, nearly 100% of the ammonia is decomposed.

Usually, the ammonia reacts with iron to form iron nitride (6). At a high temperature, however, the iron nitride is decomposed to separate into iron and a nitrogen gas (7). Accordingly, when the ferric iron is used for the ammonia decomposition, it is confirmed that reduced iron formed from the iron oxide through the reduction by hydrogen gas works as catalyst, and the ammonia is decomposed by the catalyst.

When the iron oxide or a catalyst comprising the iron oxide which has good effect on both the H₂S removal and the ammonia decomposition is used for the ammonia decomposition, a serious obstacle takes place to become unsuitable for the practical use. This is because there is H₂S and water included inevitably in the coal gas. Namely, the H₂S reacts with the iron oxide to form FeS according to the equation (1). The FeS is scarcely active in the ammonia decomposition. It is possible to remove the H₂S using the iron oxide before processing the ammonia decomposition. It is impossible, however, from the reaction equilibrium to completely remove the H₂S. Accordingly, the remaining H₂S which can not be removed in the H₂S removal process flows into the ammonia decomposition process, and reacts with the iron oxide to form the iron sulfide inactive for the ammonia decomposition.

Water in the coal gas impedes the reduction of the iron oxide according to the equation (4). Namely, since in the reaction for producing the reduced iron which is active in the ammonia decomposition, water also is produced. Therefore the reduction reaction according to the equation (4) is delayed greatly so that the reduced iron will be formed very gradually.

Figure 2:
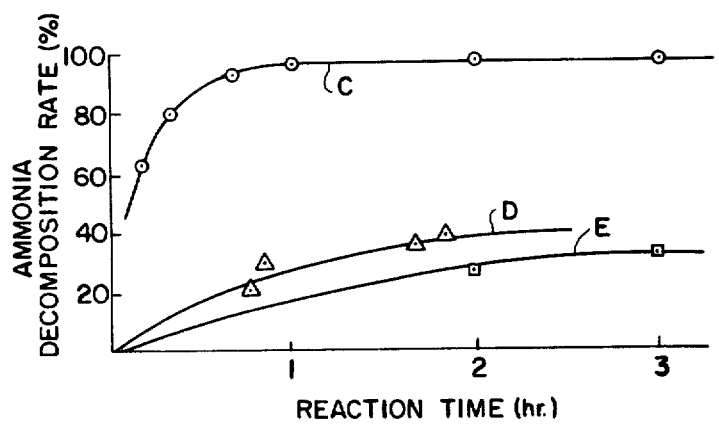
FIG. 2 is a graph showing relations between ammonia decomposition rates using iron oxide and reaction time.

FIG. 2 shows the fact that the hydrogen sulfide and water impede the ammonia decomposition by the iron oxide or the catalyst comprising the iron oxide. In FIG. 2, there are shown relations of the ammonia decomposition to reaction time, wherein the coal gases of contents of the following table 1 are contacted with the iron oxide.

TABLE 1

| Conditions | N₂ | CO | H₂ | CO₂ | CH₄ | H₂O | NH₃ | H₂S |
|---|---|---|---|---|---|---|---|---|
| C | 49% | 15% | 14% | 8% | 8% | 5% | 1% | 0 ppm |
| D | 49 | 15 | 14 | 8 | 8 | 5 | 1 | 10 |
| E | 49 | 15 | 14 | 8 | 8 | 5 | 1 | 80 |

In the condition C, the included H₂S is less than 1 ppm, nearly equal to zero.

Referring to FIG. 2, in the condition C, it is noted that in spite of including 14% of hydrogen gas, by the water of 5% the reduction of the equation (4) is delayed and much time is necessary till ammonia starts to be decomposed at a high decomposition rate. In the conditions D and E, the remaining hydrogen sulfide is contained in the coal gases, and the ammonia decomposition rate increase by a little as reaction time elapses, however, it is a low rate of 30~40%. This is because the reduction of the iron oxide by the H₂ gas is delayed by the presence of water, and the iron oxide reacts with the H₂S in the process of the reduction so that the reduced iron which is active in the ammonia decomposition is not formed enough.

By these innevitable facts, the high decomposition rate can not be expected when the iron oxide or the catalyst including the iron oxide is used for the ammonia decomposition in the presence of water and H₂S.

Figure 3:
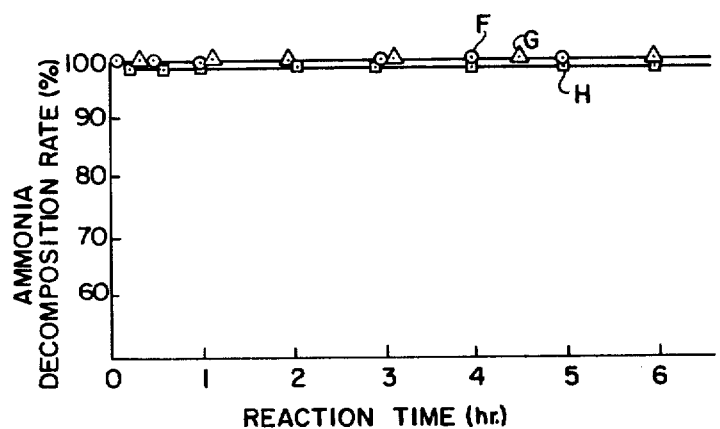
FIG. 3 is a graph showing relations between ammonia decomposition rates using reduced iron as a catalyst and reaction time.

Next, the invention will be explained referring to FIG. 3,

FIG. 3 shows a relation of ammonia decomposition rate to time, in which after a granular catalyst made of a mixture of alumina and iron oxide such as ferric oxide is filled in a fixed bed reactor and reduced with a reducing gas comprising 10% of hydrogen gas to make it into completely reduced iron, a coal gas of contents shown in table 2 is introduced in the reactor to decompose ammonia of the coal gas at a temperature of 700° C. (F), 800° C. (G).

TABLE 2

| Component | $N_2$ | $CO_2$ | $H_2$ | $CO_2$ | $CH_4$ | $H_2O$ | $NH_3$ | $H_2S$ |
|---|---|---|---|---|---|---|---|---|
| Concentration | 49% | 15% | 14% | 8% | 8% | 5% | 1% | 0.025% |

From FIG. 3 it is noted that when the catalyst is used after converting it to the reduced iron, ammonia in the above coal gas is decomposed at a high decomposition rate above 99% at the almost same time as contacted, and its decomposition ability is kept for a long time, in spite of including a high concentration such as 250 ppm of hydrogen sulfide and 5% of water. When contacted at 800° C. and SV=100 1/hr, it is confirmed that a high decomposition rate more than 99% is maintained after 45 hours running.

FIG. 3 further shows another relation H of ammonia decomposition rate to time in which the coal gas of contents of the following table 3 is introduced into the reactor to decompose ammonia at 800° C. using the same catalyst as above-mentioned.

TABLE 3

| Component | $N_2$ | CO | $H_2$ | $CO_2$ | $CH_4$ | $H_2O$ | $NH_3$ | $H_2S$ |
|---|---|---|---|---|---|---|---|---|
| Concentration | 44% | 14% | 15% | 9% | 7% | 10% | 1% | 0.025% |

From FIG. 3, it is apparent that when an iron oxide catalyst is used after reducing to reduced iron, ammonia decomposition rate is practically not reduced in spite of the existence of 10% of water, ammonia in the coal gas is decomposed at a high decomposition rate above 98% and its decomposition ability is kept for a long time. When contacted at 800° C. and SV=1000/hr, it is confirmed that the ammonia decomposition rate is not changed after 42 hours with the decomposition rate being kept high.

On the other hand, in case of decomposition of hydrogen sulfide using a granular catalyst which is made from a mixture of alumina and iron oxide elected as the removing agent of the hydrogen sulfide, when the catalyst not reduced is filled in a fixed bed reactor, and the coal gases of contents shown in table 4 is introduced into the reactor, ammonia is practically not decomposed, but the hydrogen sulfide is removed according to the equation (1) and a little amount of the hydrogen sulfide in the coal gas remains.

TABLE 4

| Gas No. | $N_2$ | CO | $H_2$ | $CO_2$ | $CH_4$ | $H_2O$ | $NH_3$ | $H_2S$ |
|---|---|---|---|---|---|---|---|---|
| 1 | 48.7% | 14.9 | 13.9 | 8 | 8 | 5 | 1 | 0.5 |
| 2 | 43.7% | 13.9 | 14.9 | 9 | 7 | 10 | 1 | 0.5 |

The remaining ammount of hydrogen sulfide is shown in Table 5, and is kept constant until immediately before the iron oxide filled in layers in the fixed bed reactor is completely converted to FeS.

TABLE 5

| Gas No. | Water | Temperature 600° C. | 700° C. | 800° C. |
|---|---|---|---|---|
| 1 | 5% | 0.5ppm | 63ppm | 150ppm |
| 2 | 10% | 0.7ppm | 75ppm | 170ppm |

It is noted from the above table 5 that the remaining amount of the hydrogen sulfide increases as an amount of water increases and temperature becomes higher, but it is not more than 250 ppm.

When hydrogen sulfide is removed using the iron oxide, the more hydrogen sulfide remains, the more the decomposition of ammonia using the reduced iron in the next step is impeded. When the hydrogen sulfide in a coal gas containing 5~10% of water is removed at a temperature between 700° C. and 800° C. using the iron oxide, however, since the remaining amount of hydrogen sulfide is less than 250 ppm in both case, the fact that ammonia was able to be removed from the coal gas containing 5~10% of water and 250 ppm of the hydrogen sulfide at a temperature of 700° C.~800° C. means that ammonia decomposition is achieved under the conditions unfavorable to to ammonia decomposition.

When both temperature and water concentration of a coal gas to be refined are high, a concentration of the remaining hydrogen sulfide after the removal of the hydrogen sulfide with the iron oxide becomes high, but after that when the ammonia decomposition is effected using the catalyst of reduced iron, the higher temperature makes the ammonia decomposition faster as compared with a lower temperature. Therefore, at a high temperature, obstructive effects due to water and hydrogen sulfide decrease from reaction equilibrium, and rather the high temperature coal gas is advantageous for ammonia decomposition.

When the coal gas is relatively lower in its temperature, a concentration of hydrogen sulfide remaining after the removal of hydrogen sulfide using the iron oxide tends to decrease to a very small amount irrespective of water concentration, and when subsequently the ammonia decomposition is effected with the reduced iron, an effect of the obstructive element is small. However, since reaction velocity of the ammonia decomposition itself becomes small, a large amount of catalyst is necessary for decomposing and removing ammonia at a high decomposition rate. Practically, the temperature at which the ammonia decomposition can be effected at a substantial high decomposition rate using a practical amount of catalyst is more than 600° C.

As above-mentioned, when the catalyst comprising iron oxide is used for the ammonia decomposition after reducing it to reduced iron, ammonia decomposition can be effected at a high rate, overcoming obstruction by hydrogen sulfide and water. When after the removal of hydrogen sulfide using the catalyst of iron oxide, subsequently the ammonia decomposition is effected using the catalyst of reduced iron, hydrogen sulfide and ammonia in the coal gas are effectively removed, whereby refining the coal gas at a high temperature can be realized.

In the above-mentioned examples, a catalyst using alumina as carrier is used. The alumina is used for carrying iron and protecting the iron from sintering. Therefore, silica, clay etc. can be used instead of the alumina.

The alumina is inactive in ammonia decomposition, so that the amount of it to be used with the iron oxide changes according to temperature at which the catalyst is to be protected from sintering. It is found by the inventors that the addition of 50% of alumina permits use of the catalyst at 900° C.

Concentration of hydrogen gas used for reducing the iron oxide is preferably determined so that the ferric oxide will be reduced completely. In a coal gas, hydrogen gas is contained so that if the coal gas is introduced into the iron oxide, the iron oxide is gradually reduced to partially form reduced iron thereby partially decomposing ammonia in the coal gas. However, in order to produce the enough reduced iron to decompose more than 90% of ammonia, much time is required so that the ammonia decomposition is not effected enough until the reduced iron is produced in a necessary amount. Further, hydrogen sulfide in the coal gas reacts with the iron oxide in the course of converting into reduced iron, so that iron sulfide inactive to ammonia is produced whereby the ammonia decomposition is not effected. Thus, in order to effect best the ammonia decomposition using a given amount of catalyst filled in layers, it is preferable to nearly perfectly reduce the iron oxide.

Figures 4, 5:
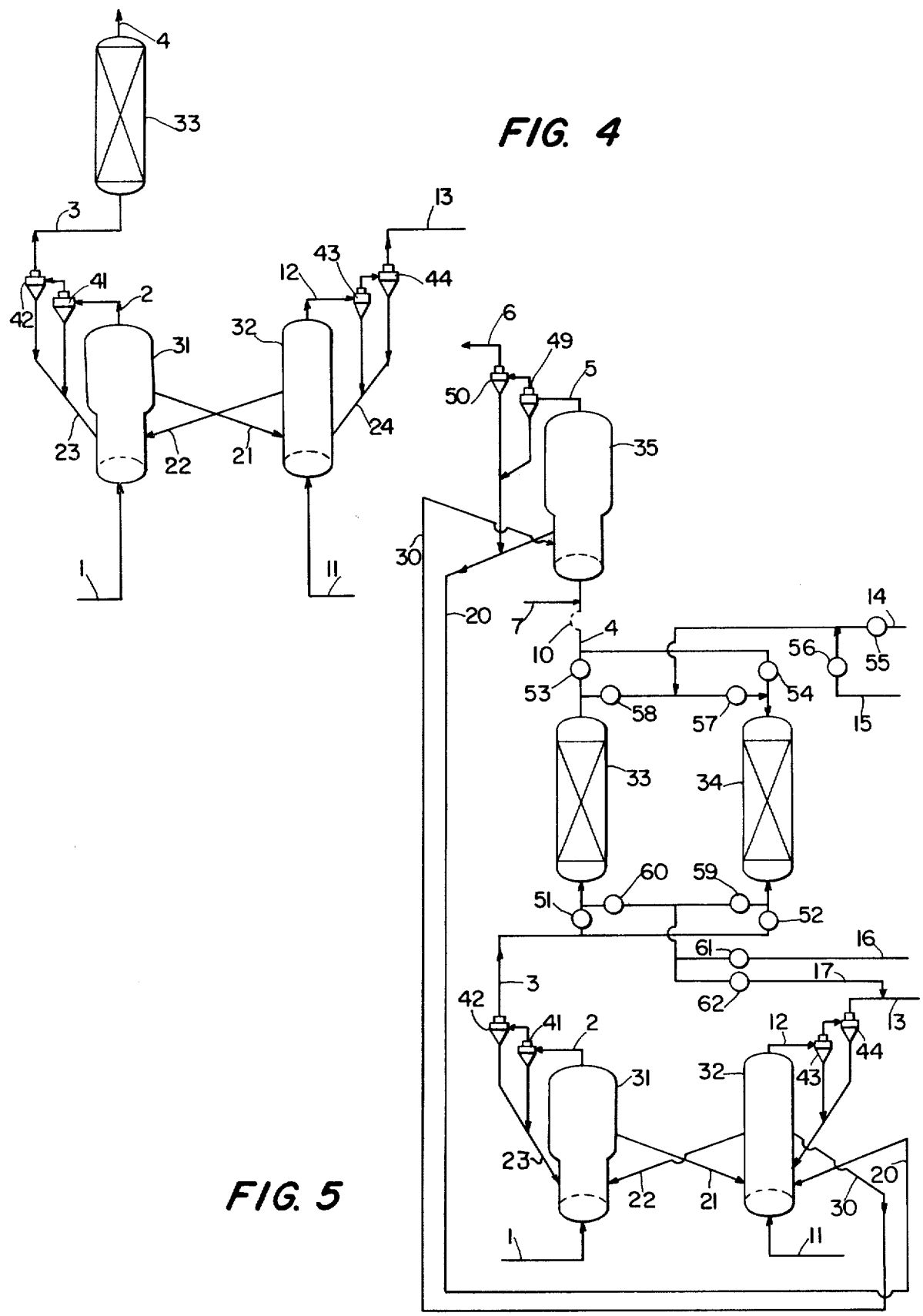
FIG. 4 is a flow sheet showing an embodiment according to the invention.
FIG. 5 is a flow sheet showing an embodiment similar to FIG. 4 including a second hydrogen sulfide removal reactor.

Embodiments according to the invention will be explained referring to Figures. FIG. 4 shows a flow sheet of a coal gas refining process, wherein, a coal gas of a high temperature is refined. When the coal gas is high in its temperature, the activity of a catalyst comprising reduced iron is little weakened by water and the remaining hydrogen sulfide in the coal gas and is kept for a long time.

In FIG. 4, the coal gas 1 produced in a gasifying furnace is transferred to a fluidized bed desulfurization reactor 31 to contact therein with a catalyst comprising iron oxide thereby removing hydrogen sulfide in the coal gas through the reaction of the hydrogen sulfide with the catalyst. The gas 2 from the desulfurization reactor 31 is transferred to two step cyclones 41, 42 thereby separating accompanying solid fine particles from the gas 2. The fine particles separated from the gas 2 are returned to the desulfurization reactor 31 through a passage 23. The gas 3 from the cyclones 41, 42 including a little amount of hydrogen sulfide is transferred to an ammonia decomposition reactor 33. In the ammonia decomposition reactor 33, iron oxide such as ferric oxide or a catalyst comprising the iron oxide is converted to reduced iron through the reduction and filled. Ammonia in the gas 3 is decomposed in the reactor 33 and removed therefrom. The gas 4 going out from the reactor 33 is a purified or refined coal gas free from the hydrogen sulfide and ammonia.

The iron oxide or catalyst comprising iron oxide a part of which is converted to iron sulfide in the reactor 31 through the reaction with hydrogen sulfide is partially pulled out from the reactor 31 and transferred to an iron oxide regeneration reactor 32 through a passage 21. In the regeneration reactor 32, the iron sulfide is oxidized thereby regenerating iron oxide according to the equations (2), (3) with air or a mixture gas of air and steam supplied from a passage 11. The regenerated catalyst is extracted and returned to the desulfurization reactor 31 through a passage 22 to again be used for the removal of hydrogen sulfide. The gas 12 from the regeneration reactor 32 from which the accompanying fine solid particles are removed in cyclones 43, 44 is transferred to a step of sulfur recovery through a passage 13. The fine solid particles separated from the gas 12 is returned to the regeneration reactor 32 through a passage 24.

As the gas 1, a coal gas as shown in Table 6 is used.

TABLE 6

| Component | $N_2$ | CO | $H_2$ | $CO_2$ | $CH_4$ | $H_2O$ | $NH_3$ | $H_2S$ |
|---|---|---|---|---|---|---|---|---|
| Concentration | 43.7% | 13.9 | 14.9 | 9 | 7 | 10 | 1 | 0.5 |

The catalyst which is used in the desulfurization reactor 31 is a mixture of ferric oxide and alumina, which mixture is granular. Concentration of hydrogen sulfide included in the gas 3 from the desulfurization reactor 31 was 200 ppm.

The catalyst filled in the ammonia decomposition reactor 33 is formed by making a granular mixture of alumina and ferric oxide and then reducing the granular mixture with reducing agent including hydrogen gas. The gas 4 from the ammonia decomposition reactor 33 includes 90 ppm of ammonia and 200 ppm of hydrogen sulfide, which results in the decomposition of ammonia more than 99%.

The iron oxide regeneration gas is adjusted in a mixture ratio of air and steam and its temperature so that regeneration temperature will be 800° C.

According to this embodiment, ammonia and hydrogen sulfide are decomposed by a simple process at a high decomposition rate and removed. Further, the coal gas can be refined at a high temperature thereby realizing economically an electric power generation system.

Another embodiment will be described hereinafter referring to FIGS. 5 and 6.

This embodiment is preferable in case where tar in the coal gas adheres to the catalyst for ammonia decomposition to weaken the ability of ammonia decomposition or in case where temperature of the coal gas itself is low so that the ammonia decomposition ability is lowered. In those cases, it is necessary to recover the activity of ammonia decomposition catalyst weakened in its activity during processing the refining.

In FIG. 5, a coal gas 1 produced in a gasifying furnace is transferred to a desulfurization reactor 31, wherein hydrogen sulfide is converted to iron sulfide by the reaction with the iron oxide and removed from the gas. The gas 2 from the desulfurization reactor 31 is transferred to an ammonia decomposition reactor 33 through an open valve 51, with its accompanying fine particles being separated in cyclones 41 and 42 and returned to reactor 33 through line 23. In the ammonia decomposition reactor 33, there is a catalyst comprising reduced iron formed by iron oxide reduction. Ammonia entering the ammonia decomposition reactor 33 is decomposed by the catalyst of reduced state of the iron oxide. The gas 4 from the ammonia decomposition reactor 33 is a refined coal gas 4 going out through on open valve 53.

The catalyst comprising iron oxide, part of which is converted to iron sulfide by the reaction with hydrogen sulfide in the desulfurization reactor 31, is taken out through a passage 21 and transferred to an iron oxide regeneration reactor 32. In the reactor 32, the iron oxide is oxidized with a regeneration gas of air or a mixture of air and steam from a passage 11 so that the iron oxide is regenerated according to the equations (2), (3). The regenerated iron oxide catalyst is transferred to the desulfurization reactor 31 through a passage 22 to be used for the removal of hydrogen sulfide. Regeneration gas 12 from the regeneration reactor 32 is transferred to a step for recovering sulfur component through a passage 13, with its accompanying solid particles being separated in cyclones 43, 44.

In a reduced iron regeneration reactor 34, the catalyst in reduced iron state the activity to the ammonia decomposition of which is partially weakened by adhesion of tar or the production of iron sulfide, is regenerated. The regeneration operation is conducted in such a way that the tar or iron sulfide adhered to the catalyst in the reduced state is oxidized with a regeneration gas 15 including air and removed, at the same time the catalyst in the reduced state is oxidized to form iron oxide thereby removing impurity and adhesive material. Gas from the regeneration reactor 34 is transferred through passage 17 to the regeneration gas passage 13 through open valves 59, 62 to mix with the gas from the reactor 32, with valves 55, 61 being closed. When all filling material in the regeneration reactor 34 is oxidized, and the oxidation removal of the impurity and the production of iron oxide are completed, the valves 56, 62 are closed, the valves 55, 61 are opened to supply a reducing gas 14 to the regeneration reactor 34 through the valves 55, 57. In the regeneration reactor 34, the iron oxide is reduced to form reduced iron state, whereby the activity to the ammonia decomposition is restored substantially. Reducing gas from regeneration reactor 34 is transferred through passage 16 for proper treatment.

The valves 51, 53, 57 and 59 are opened and the valves 52, 54, 58 and 60 are closed with the ammonia decomposition is effected in the reactor 33 and the reduced iron is regenerated in the regeneration reactor 34. When the reduced iron regeneration operation in the reactor 33 is completed, and the ammonia decomposition reactor 33 presents the tendency to decrease in the activity in the ammonia decomposition, the operation is changed to the ammonia decomposition in the regeneration reactor 34 and the regeneration of the reduced iron in the ammonia decomposition reactor 33 by closing the valves 51, 53, 57 and 59 and opening the valves 52, 54, 58, 60. The changeover operation is repeated periodically.

In this embodiment, a coal gas of 900° C. having the contents shown in Table 7 is used.

TABLE 7

| Component | $N_2$ | CO | $H_2$ | $CO_2$ | $CH_4$ | $H_2O$ | $NH_3$ | $H_2S$ |
|---|---|---|---|---|---|---|---|---|
| Concentration | 48.7% | 14.9 | 13.9 | 8 | 8 | 5 | 1 | 0.5 |

The coal gas going out of the desulfurization reactor 31 after refining by the removal of hydrogen sulfide using the catalyst which is a granular mixture of alumina and iron oxide formed as granules having 75 ppm of hydrogen sulfide remaining therein. In the ammonia decomposition reactor 33, the catalyst, that a granular mixture of alumina and iron oxide which is reduced by the reducing gas including hydrogen gas to form its reduced state, is filled. The coal gas 4 going out from the ammonia decomposition reactor 33 includes 85 ppm of ammonia and 75 ppm of hydrogen sulfide. The ammonia decomposition rate was more than 99%. Temperature and mixture ratio of air and steam in the iron oxide regeneration gas 11 is adjusted so that regeneration temperature will be 700° C. Temperature and mixing ratio between air and steam is adjusted so that regeneration temperature of gas 15 will be 600° C. Further as the reducing gas 14, a reducing gas including 10% of hydrogen gas is used.

Another embodiment will be explained referring to FIG. 6.

Figure 6:
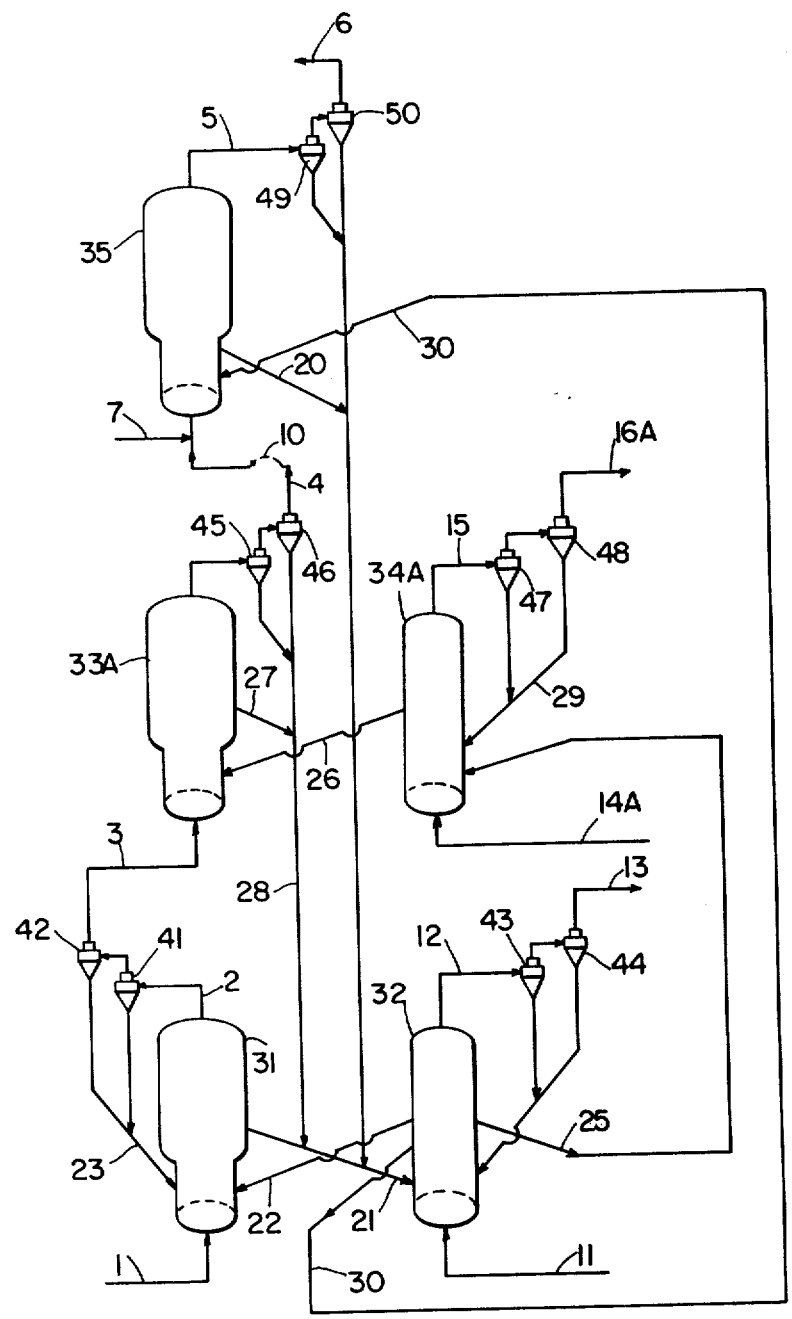
FIG. 6 is a flow sheet of another embodiment of the invention similar to FIG. 5 including means to regenerate the catalyst in the second hydrogen sulfide reactor.

In FIG. 6, a coal gas 1 produced in a gasifying furnace is transferred to a desulfurization reactor 31 to remove hydrogen sulfide as iron sulfide through the reaction with iron oxide. The gas 2 from the desulfurization reactor 31 enters a fluidizing bed ammonia decomposition reactor 33A after separating therefrom accompanying solid fine particles in cyclones 41, 42. In the ammonia decomposition reactor 33A, a reduced iron state catalyst contacts with the coal gas while fluidizing to decompose ammonia in the coal gas. The gas 4 from the ammonia decomposition reactor 33A is a refined coal gas, with its accompanying solid fine particles being separated therefrom. The solid fine particles separated by the cyclones 45, 46 is transferred to an iron oxide regeneration reactor 32 through passages 28, 21 together with a part of the reduced iron catalyst taken out from the ammonia decomposition reactor 33A through a passage 27. The iron oxide catalyst partially converted to iron sulfide through the reaction with hydrogen sulfide in the desulfurization reactor 31 is taken out little by little through the passage 21 and transferred to an iron oxide regeneration reactor 32 in which particles from the desulfurization reactor 31 and ammonia decomposition reactor 33A are oxidized with iron oxide regeneration gas 11 and iron oxide is regenerated and produced according to the reaction equation (2), (3) and the following equation (8).

$$4Fe + 3O_2 \rightarrow 2Fe_2O_3 \qquad (8)$$

Part of the iron oxide catalyst in the iron oxide regeneration reactor 32 is taken out and transferred to the desulfurization reactor 31 through a passage 22 to be used for the removal of hydrogen sulfide. Another part of the iron oxide catalyst is taken out through a passage 25 to transfer to a reduced iron regeneration reactor 34A. In the reduced iron regeneration reactor 34A, a reducing gas 14A and the iron oxide catalyst contact each other fluidizing, thereby converting the iron oxide to reduced iron through the reduction between the iron oxide and hydrogen gas. The catalyst converted into a reduced state is partially taken out from the reactor 34A to be transferred to the ammonia decomposition reactor 33A through a passage 26, and serves as catalyst for the ammonia decomposition.

The gases 12, 15 from the iron oxide regeneration reactor 32 and the reduced iron regeneration reactor 34A are subjected to the separation treatment of the solid fine particles by the cyclones 43, 44, 47, 48, and then transferred to proper treatment processes through passages 16A, 13. The solid fine particles are returned to the reactor 34A through passage 29.

Temperature of the coal gas 1 treated in this embodiment is 800° C., and the gas contents are shown in the following table 8.

TABLE 8

| Component | $N_2$ | CO | $H_2$ | $CO_2$ | $CH_4$ | $H_2O$ | $NH_3$ | $H_2S$ |
|---|---|---|---|---|---|---|---|---|
| Concentration | 48.7% | 14.9% | 13.9% | 8% | 8% | 5% | 1% | 0.5% |

The catalyst used in the whole process is a granular mixture of alumina and iron oxide.

Hydrogen sulfide remaining in the gas 3 coming out of the desulfurization reactor 31 was 180 ppm. Ammonia remaining in the gas was the same in its concentration as in gas 1. The ammonia is decomposed in the ammonia decomposition reactor 33A through the reaction with the catalyst of reduced state, and ammonia remaining in the gas 4 was 45 ppm, more than 99.5% of ammonia in the coal gas 1 was decomposed. Hydrogen sulfide remaining in the gas 4 is about 180 ppm.

The iron oxide regeneration gas 11 and the reducing gas 14 are adjusted in the same manner as in the embodiment of FIG. 5.

According to this embodiment, since the catalyst made from the same material is used for the ammonia decomposition and the desulfurization, the process for regenerating the catalyst for the ammonia decomposition and the desulfurization is combined into the process for the ammonia decomposition and the desulfurization effectively and economically.

Further, in all the embodiments, the catalyst the reactor of 35 is the same catalyst as in the reactor 31. The hydrogen sulfide remaining in the gas 4 is removed in the reactor 35. The gas 5 from the reactor 35 is subjected to the removal of accompanying solid particles by cyclones 49, 50. The separated solid particles by the cyclones 49, 50 and leaves this process as gas 6 are transferred to the reactor 32 through passage 20 together with part of the catalyst in the reactor 35 which is partially converted to iron sulfide. The catalyst regenerated in the reactor 32 is transferred to the reactor 35 to serve for the removal of hydrogen sulfide.

In case of a coal gas of 800° C., hydrogen sulfide of the gas decreased to 200 ppm by the reactor 31 is further decreased to 40 ppm by the second hydrogen sulfide reactor 35. The gas temperature is adjusted 600° C. by the water spraying.

In FIG. 6, a coal gas 4 treated by the hydrogen sulfide removal reactor 31 and the ammonia removal reactor 33A is transferred to a second fluidizing bed hydrogen sulfide removal reactor 35 with a passage from the reactor 33A being joined at 10, its temperature is adjusted by water spraying 7. In the reactor 35, the same catalyst as in the reactor 31 is filled. The accompanying solid particles of the gas 5 from the reactor 35 are separated by the cyclones 49, 50, and then transferred to the reactor 32 with the catalyst partially taken out from the reactor 35 through a passage 20 to be regenerated therein. The regenerated catalyst is transferred to the reactor 35 through a passage 30 to serve for the removal of hydrogen sulfide.

Hydrogen sulfide concentration of the gas of 800° C., decreased to 180 ppm by the reactor 31 is further decreased to 10 ppm by the reactor 35 after the gas is lowered to 600° C. by the water spraying 7, used for the desulfurization and ammonia decomposition is formed in the same manner except for reduction of iron oxide so that all the process is operated economically.

A coal gas of a high temperature is low in a hydrogen sulfide decomposition rate and high in ammonia decomposition rate. In the high temperature gas, it is preferable to provide a second desulfurization step accompanying temperature adjustment.

Referring back to FIG. 5, and 6 the abovementioned second desulfurization step will be described hereinafter.

In FIG. 5, a coal gas 4 treated by the hydrogen sulfide removal reactor 31 and the ammonia removal reactor 33 is transferred to a second fluidizing bed hydrogen sulfide removal reactor 35 with a passage from the reactor 33 being jointed at 10 after its temperature is lowered by water spraying 7.

Usually, a coal gas for an electric power plant produced by gasifying coal includes 5 ~ 10% of water, and goes out from a gasifying furnace at a temperature between 750° and 850° C. The following table 9 shows examples of coal gas contents presenting different water concentration.

TABLE 9

| Component Gas No. | $N_2$ | CO | $H_2$ | $CO_2$ | $CH_4$ | $H_2O$ | $NH_3$ | $H_2S$ |
|---|---|---|---|---|---|---|---|---|
| 1A | 48.5% | 14.8 | 14.0 | 8.2 | 8.0 | 5.0 | 1.0 | 0.5 |
| 1B | 43.5% | 14.2 | 15.0 | 8.2 | 7.0 | 10.0 | 1.0 | 0.5 |

The coal gas 1A containing 5% of water and the coal gas 1B containing 10% of water each are contacted with a granular catalyst consisting of a mixture of alumina and iron oxide at temperatures of 750° C. and 850° C. to remove hydrogen sulfide. The greater amount, 250 ppm of hydrogen sulfide remained when the coal gas 1B contacted at 850° C., and the least amount, 100 ppm of the hydrogen sulfide was left in the coal gas 1A when contacted at 750° C. Therefore, it is found that 100~250 ppm of hydrogen sulfide remains when the hydrogen sulfide removal of the usual coal gas for an electric power plant is effected at the gasifying furnace outlet temperature. In order to achieve the desulfurization rate more than 99%, that is the remaining hydrogen sulfide less than 50 ppm, it is necessary that the coal gas 1A containing 5% water contacts with the catalyst at 700° C., and the coal gas 1B containing 10% water, at 650° C.

The coal gases 1A and 1B were contacted with ammonia decomposition catalyst after contacting with the hydrogen sulfide removal catalyst. The ammonia decomposition catalyst is produced by a reducing gas containing hydrogen gas after making a mixture of alumina and iron oxide granules. The ammonia decomposition rate after the elapse of 45 hours from starting to contact the coal gas with the catalyst is as follows. For the coal gas 1A which was necessary to lower it temperature to 700° C. in order to achieve the remaining hydrogen sulfide less than 50 ppm, the ammonia decomposition rate is 93% at 700° C. and increased to 99% by elevating its temperature to 720° C. On the other hand, for the coal gas 1B which was necessary to lower its temperature to 650° C. in order to decrease the remaining hydrogen sulfide concentration to 50 ppm, the ammonia decomposition rate is 45% at 650° C., and increased to 99% by elevating the decomposition temperature to 750° C. The decomposition temperature necessary for keeping the ammonia decomposition rate at 99% is determined according to an amount of water and hydrogen sulfide in the coal gas. However, even if a coal gas containing 10% of water is decomposed to remove hydrogen sulfide at a gasifizing furnace outlet temperature of 850° C., and hydrogen sulfide of high concentration such as 250 ppm remains in the coal gas, the ammonia decomposition catalyst is not affected by the remaining hydrogen sulfide and the ammonia decomposition rate is kept 99% when the ammonia decomposition temperature is higher than 800° C.

The abovementioned fact means that when the ammonia decomposition temperature is set at a temperature above the hydrogen sulfide removal temperature or above 800° C., the remaining hydrogen sulfide which was not removed in the hydrogen sulfide removal step does not give bad influence on reduced state iron for the ammonia decomposition thereby providing the ammonia decomposition at a high decomposition rate.

An embodiment of a refining process of coal gas including temperature control steps according to the invention will be described hereinafter referring to FIG. 7.

Figure 7:
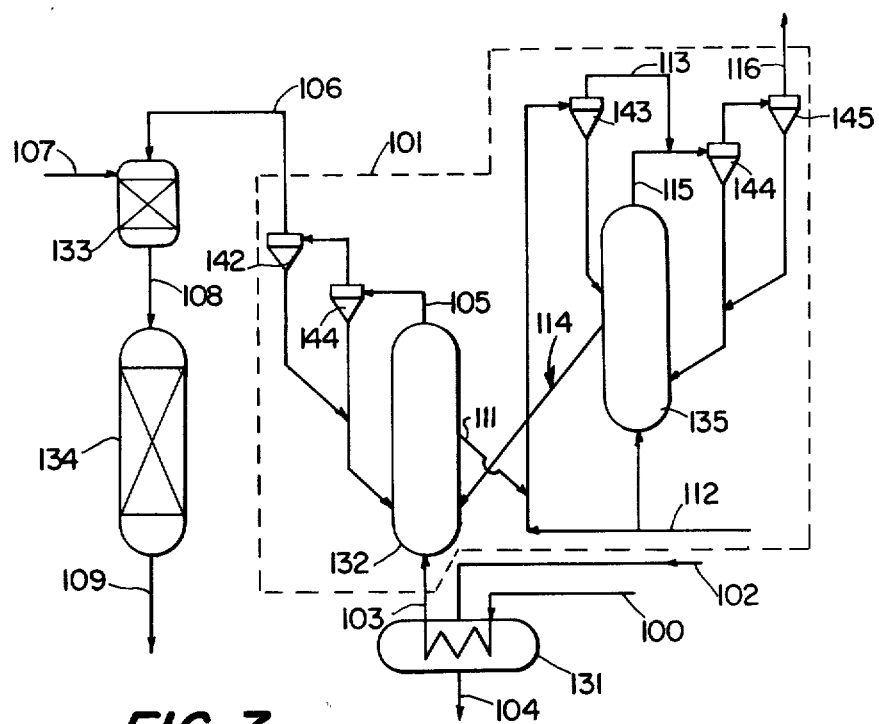
FIG. 7 is a flow sheet of another embodiment of the invention including temperature control means.

In FIG. 7, a coal gas 100 from a gasifying furnace is transferred to a hydrogen sulfide removal reactor 132 through a passage 103 after controlled to a temperature suitable for the removal of hydrogen sulfide at a high removal rate in a waste heat boiler 131. In the reactor 132, hydrogen sulfide in the coal gas is converted to iron sulfide and removed by contacting with a granular catalyst comprising iron oxide in a fluidizing state. The coal gas from the hydrogen sulfide removal reactor 132 through passage 105 and is is transferred to an oxidization reactor 133 through a passage 106, after the accompanying solid particles are separated in cyclones 141, 142. The coal gas is transferred through passage 108 and enters an ammonia decomposition reactor 134 after the coal gas is partially combusted and elevated in its temperature by air 107 controlled in its flow rate, in the oxidization reactor 133 in which ammonia and a little cyanogen gas in the coal gas is decomposed to be converted to a refined high temperature coal gas 109 through the contact with the ammonia decomposition catalyst. The refined high temperature coal gas 109 is transferred toward a gas turbine.

Heat obtained through the temperature adjustment of the coal gas in the waste heat boiler 131 is consumed by converting water 102 to steam 104. The catalyst converted to iron sulfide from the iron oxide through the reaction with hydrogen sulfide in the hydrogen sulfide removal reactor 132 is taken out through a passage 111 and transferred to a regeneration reactor 135 by gas transportation after separating a regeneration gas in a cyclone 143 because the catalyst loses its hydrogen sulfide removal ability. In the regeneration reactor 135, the catalyst contacts with a regeneration gas 112 including oxygen in a fluidized state whereby the iron sulfide is converted to iron oxide. The catalyst the hydrogen sulfide removal ability of which is restored is taken out from the regeneration reactor 135 and returned to the reactor 132 through a passage 114 to be used repeatedly for the removal of hydrogen sulfide. A regeneration gas 115 containing sulfurous acid gas which is produced when the iron oxide is regenerated is transferred through passage 116 to a next step passing through cyclones 144, 145 together with part of the regeneration gas for the gas transportation.

The coal gas 100 used in this process has the following contents and its temperature is 800° C.

TABLE 10

| Component | N$_2$ | CO | H$_2$ | CO$_2$ | CH$_4$ | H$_2$O | H$_2$S | COS | NH$_3$ | HCN |
|---|---|---|---|---|---|---|---|---|---|---|
| Concentration | 48.5% | 15.3 | 12.8 | 9.5 | 2.6 | 10.5 | 0.4 | 0.03 | 0.4 | 0.01 |

The coal gas 103 is cooled to 645° C. through the heat exchange in the waste heat boiler 131. The catalyst used in the hydrogen sulfide removal reactor 132 is a granular mixture of iron oxide and alumina. In the coal gas 106 coming out of the hydrogen sulfide removing reactor 132 only 34 ppm of hydrogen sulfide and 1∼2 ppm of HCN remains. The about 5% of the coal gas 106 of about 5% is combusted in the oxidizing reactor 133 to elevate its temperature to 800° C. The catalyst filled in the ammonia decomposition reactor 134 is mixture of iron oxide and alumina which is granular and reduced by a reducing gas containing hydrogen gas to be formed in a reduced iron state. By this catalyst, more than 99% of ammonia and cyanogen gas are decomposed, and the remaining ammonia is 20 ppm, cyanogen gas, less than 1 ppm.

Another embodiment will be described hereinafter referring to FIG. 8.

Figure 8:
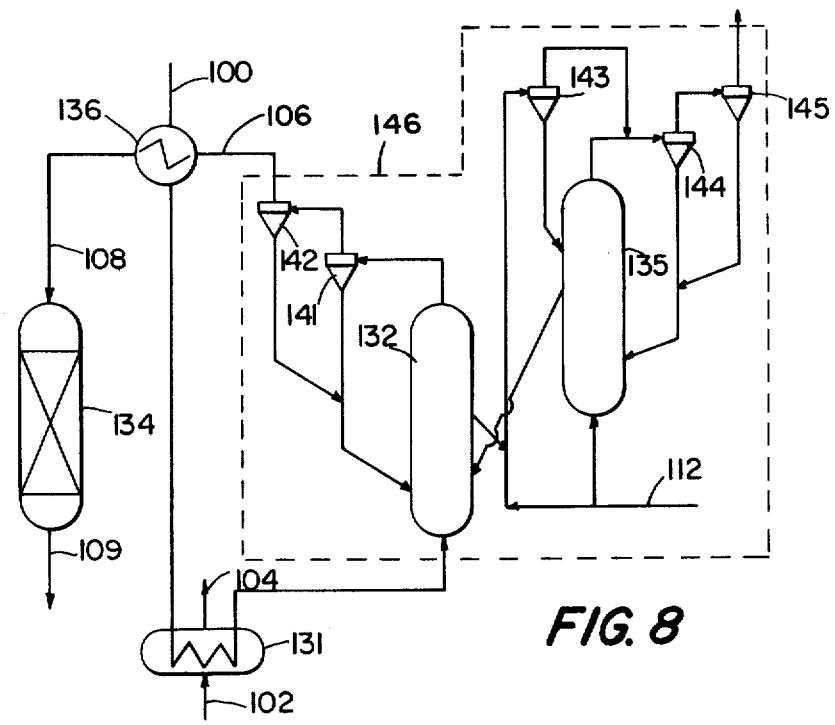
FIG. 8 is a flow sheet of another embodiment of the invention similar to FIG. 7 including temperature control steps.

In FIG. 8, a portion embraced by a dotted line 146 is the same as a portion embraced by a dotted line 101 in FIG. 7. Therefore, the explanation of this portion will be omitted.

A coal gas 100 of 850° C. having the same contents as the coal gas used in FIG. 7 is cooled by a heat exchanger 136 and a waste heat boiler 131 to 640° C. and transferred to the hydrogen sulfide removal reactor 132 to remove hydrogen sulfide therefrom. The coal gas from the reactor 132 is heated with the coal gas 100 in the heat exchanger 136 to 810° C. and then transferred to an ammonia removal reactor 134 through a passage 108 to remove ammonia and cyanogen gas.

In the coal gas 106, about 40 ppm of hydrogen sulfide and 2 ppm of carbonyl sulfide remained. In the coal gas 109 from the ammonia decomposition reactor 134, ammonia of 15 ppm and cyanogen gas less than 1 ppm remains.

The catalyst, for the removal of ammonia and the catalyst for removal of hydrogen sulfide are the same as used in FIG. 7. Also as in FIG. 7, heat obtained through the adjustment of the coal gas in the waste heat boiler is consumed by converting water 102 to steam 104.

What is claimed is:

1. A process for refining hot gas containing hydrogen sulfide and ammonia, comprising the steps of:
   providing a gas containing substantial amounts of hydrogen sulfide and ammonia that are desired to be removed from the gas;
   contacting the gas at a temperature in the range of 600°–850° C. with an iron oxide catalyst in a first container to remove hydrogen sulfide;
   contacting the gas at a temperature in the range of 700°–900° C. with a catalyst obtained by reducing iron oxide with a reducing agent to produce elemental iron, to remove ammonia from the gas in a second container; and
   contacting the gas at a temperature of 600° C. or less in a third container with iron oxide to remove hydrogen sulfide remaining in the gas after the first hydrogen sulfide removal step and the ammonia removal step.

2. A process for refining a hot gas containing hydrogen sulfide and ammonia, comprising the steps of:
   providing a gas containing substantial amounts of hydrogren sulfide and ammonia that are desired to be removed from the gas;
   contacting the gas at a temperature in the range of 600°–850° C. with an iron oxide catalyst in a first container in order to remove hydrogen sulfide by the formation of iron sulfide and water;

contacting the gas at a temperature in the range of 650°–900° C. with a catalyst obtained by reducing iron oxide with a reducing agent to produce elemental iron in a second container, in order to remove ammonia from the gas by decomposing ammonia into nitrogen gas and hydrogen gas; and further contacting the gas at a temperature of 600° C. or less with an iron oxide catalyst to remove hydrogen sulfide remaining in the gas after the first-mentioned hydrogen sulfide removal step, by the formation of iron sulfide and water.

3. The process according to claim 1 or 2, wherein said second step of contacting is conducted at a temperature in the range of 800°–900° C.

4. The process according to claim 1 or 2, wherein said first step of contacting is conducted at a temperature in the range of 600°–800° C., and said second step of contacting is conducted at a temperature in the range of 800°–900° C.

5. The process according to claim 1 or 2, wherein between said second step of contacting and said third step of contacting the temperature of the gas is reduced to 600° C. or less by water spraying.

6. The process according to claim 1 or 2, including regenerating the catalyst from said first container and said third container by contacting the iron sulfide with a gas at least including air so as to oxidize the iron sulfide and obtain iron oxide and sulfur oxide and removing the sulfur oxide from the iron oxide.

7. A process for refining a hot coal gas produced by gasifying coal, to be used in an electric power plant, comprising the steps of:

gasifying coal to produce a hot coal gas having a temperature of 750°–850° C. and containing substantial amounts of hydrogen sulfide and ammonia that are desired to be removed from the gas;

cooling the hot coal gas to a temperature of 640° C.;

contacting the hot coal gas with an iron oxide catalyst so as to remove the hydrogen sulfide from the gas by the formation of FeS and water;

heating the hot coal gas to a temperature in the range of 800°–900° C.; and contacting the hot coal gas having a temperature in the range of 800°–900° C. with a catalyst obtained by reducing a granular mixture of iron oxide and a metal carrier with a reducing agent comprising hydrogen gas, to completely reduce the iron, to remove ammonia from the hot coal gas; whereby a high temperature refined coal gas is obtained for the electric power plant.

8. A process for refining a hot gas containing hydrogen sulfide and ammonia, comprising the steps of:

providing a gas containing substantial amounts of hydrogen sulfide and ammonia that are desired to be removed from the gas;

contacting the gas at a temperature in the range of 600°–850° C. with an iron oxide catalyst in a first container in order to remove hydrogen sulfide by the formation of iron sulfide and water; and contacting the gas at a temperature in the range of 650°–900° C. with a catalyst obtained by reducing iron oxide with a reducing agent to produce elemental iron in a second container, in order to remove ammonia from the gas by decomposing ammonia into nitrogen gas and hydrogen gas.

9. The process according to claim 8, wherein an iron nitride compound is produced in said step of contacting the gas with elemental iron, and including:

oxidizing the iron nitride compound with a gas, at least including air, so as to regenerate the iron nitride compound into iron oxide;

thereafter regenerating the iron oxide obtained from the preceding step through contact with a reducing gas to reduce the iron oxide to elemental iron; and thereafter using the thusly obtained elemental iron in said step of contacting the gas with elemental iron.

10. The process according to claim 8, wherein after both said above-mentioned steps of contacting, further contacting the gas from said preceding steps of contacting separately with an iron oxide catalyst at a temperature of 600° C. or less to remove any remaining hydrogen sulfide.

11. The process according to claim 8, including regenerating the catalyst from the step of contacting the gas with iron oxide by contacting the iron sulfide with a gas at least including air so as to oxidize the iron sulfide and obtain iron oxide and sulfur oxide, and removing the sulfur oxide from the iron oxide.

12. The process according to claim 8, including a step of increasing the temperature of the gas between said step of contacting the gas with iron oxide, and said step of contacting the gas with elemental iron, so that the gas will be at a higher temperature during the decomposing of ammonia than during the removal of hydrogen sulfide.

13. The process according to claim 8, wherein said step of contacting the gas with elemental iron is conducted at a temperature in the range of 800°–900° C.

14. The process according to claim 8, wherein said step of contacting the gas with iron oxide is conducted at a temperature in the range of 600°–800° C., and said step of contacting the gas with elemental iron is conducted at a temperature in the range of 800°–900° C.

15. The process according to claim 8, wherein said step of contacting the gas with iron oxide is conducted for a sufficiently long period of time and at a temperature sufficient to remove the hydrogen sulfide so that the resulting gas will have a hydrogen sulfide content less than 250 ppm.

16. The process according to claim 12, wherein said step of increasing the temperature includes combusting a portion of the gas between said step of contacting the gas with iron oxide and said step of contacting the gas with elemental iron to thereby raise its temperature by the heat of such combustion.

17. The process according to claim 12, wherein said step of increasing the temperature includes providing heat exchange between the gas before said step of contacting the gas with iron oxide and the gas after said step of contacting the gas with iron oxide so as to transfer the sensible heat.

18. The process according to claim 1 or 2, wherein an iron nitride compound is produced in said second step of contacting, and including:

oxidizing the iron nitride compound with a gas, at least including air, so as to regenerate the iron nitride compound into iron oxide;

thereafter regenerating the iron oxide obtained from the preceding step through contact with a reducing gas to reduce the iron oxide to elemental iron; and thereafter using the thusly obtained elemental iron in said second step of contacting.

19. The process according to claim 1 or 2, including a step of increasing the temperature of the gas between said step of contacting the gas with iron oxide and said step of contacting the gas with elemental iron, so that the gas will be at a higher temperature during the decomposing of ammonia than during the removal of hydrogen sulfide.

20. The process according to claim 19, wherein said step of increasing the temperature includes combusting a portion of the gas between said step of contacting the gas with iron oxide and said step of contacting the gas with elemental iron to thereby raise its temperature by the heat of such combustion.

21. The process according to claim 19, wherein said step of increasing the temperature includes providing heat exchange between the gas before said step of contacting the gas with iron oxide and the gas after said step of contacting the gas with iron oxide so as to transfer the sensible heat.

* * * * *